United States Patent [19]

Graham

[11] Patent Number: 4,605,241
[45] Date of Patent: Aug. 12, 1986

[54] RACING BICYCLE FRAMESET

[75] Inventor: David R. Graham, West Redding, Conn.

[73] Assignee: Cannondale Corporation, Georgetown, Conn.

[21] Appl. No.: 686,652

[22] Filed: Dec. 27, 1984

[51] Int. Cl.⁴ .............................................. B62D 19/06
[52] U.S. Cl. ................................................ 280/281 R
[58] Field of Search ....... 280/281 R, 281 LP, 281 W, 280/278, 287, 259, 261

[56] References Cited

FOREIGN PATENT DOCUMENTS

Ad.6778  3/1907  France ............................. 280/281 R
16207 of 1896  United Kingdom ............ 280/281 R Primary Examiner—John A. Pekar
Attorney, Agent, or Firm—Brumbaugh, Graves, Donohue & Raymond

[57] ABSTRACT

A racing bicycle frameset comprises a single straight seat tube, the centerline of which intersects the horizontal plane that includes the bottom bracket tube a substantial distance forwardly of the centerline of the bottom bracket tube.

3 Claims, 1 Drawing Figure

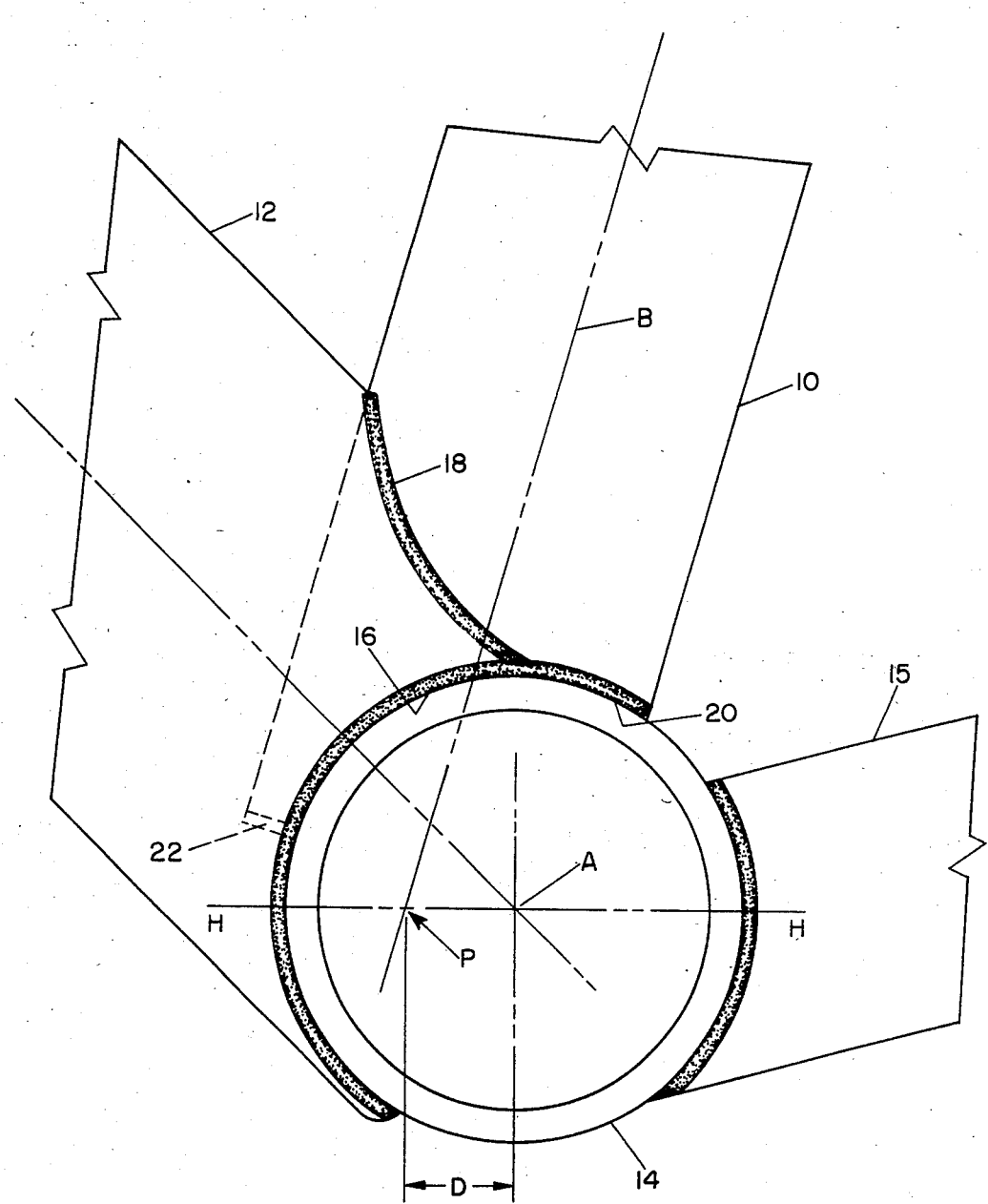

RACING BICYCLE FRAMESET

BACKGROUND OF THE INVENTION

The racing bicycle has evolved into a technologically sophisticated device constructed to give the racer every possible edge over his or her competitors. In choosing a bicycle, the racer looks at, among many things, every detail of the construction of the frameset, such as the weight, aerodynamics, material, geometry and wheelbase. An important characteristic of the geometry of the frameset is a short chainstay length. In addition to the obvious role of a short chainstay length in providing the desired short wheelbase, short chainstays ensure maximum stiffness in the rear triangle, all other things being equal. The racer wants this maximum stiffness to minimize the loss of the energy exerted in pedalling to bending the frame and hence maximize the efficiency of the transfer of energy to the rear wheel.

Bicycle builders have heretofore fulfilled the racer's need for a short chainstay length in one of the following ways: (1) form a crimp in the rear surface of the seat tube where the rear wheel is closest; (2) provide a bifurcated seat tube, something like the front fork, or two separate seat tubes that straddle the rear wheel; and (3) curve the seat tube. These designs have various disadvantages. Crimping the seat tube weakens it, thus partly or wholly offsetting the advantage of the short chainstay length in making the frame as stiff as possible. Bifurcated or dual seat tubes are weak in torsion, so again the frame has reduced stiffness, and there are usually weight and aerodynamic drag penalties. Bending a tube weakens it somewhat, but this is probably the preferred solution. It has not, however, been widely accepted, probably for aesthetic reasons—it doesn't look as strong.

SUMMARY OF THE INVENTION

In accordance with the present invention, a short chainstay length is provided in a racing bicycle frameset by a unique construction of the bottom bracket joint, i.e., the junctures of the bottom bracket with the down tube, seat tube and chainstays. In particular, the centerline of a single straight seat tube intersects the horizontal plane of the frameset that includes the centerline of the bottom bracket tube a substantial distance forwardly of the bottom bracket tube centerline. Preferably, the forward offset distance of the seat tube centerline is less than the outside radius of the seat tube.

What is described in the preceding paragraph in relatively cumbersome but precise terms is a frameset in which the seat tube is moved forwardly a small distance relative to the bottom bracket, thereby allowing the chainstays to be made a little shorter because the rear wheel can be a little closer to the bottom bracket and still clear the seat tube. The forward offset of the seat tube is only of the order of ¼ to ½ inch, but that is a significant amount, when considered in the context of the refinement of design—the competitive edge—that bikers look for in a competition bicycle. That little edge is analagous to those few additional horsepower that car racers work so hard to get out of their 500 H.P. racing car engines. It will provide that few feet of distance between the First and Second racers in the final sprint to the finish and reduce the exertion needed to stay on the pace enough to leave a little extra for the sprint.

DESCRIPTION OF THE DRAWING

The drawing is a side elevational view of the bottom bracket joint of a frameset embodying the invention.

DESCRIPTION OF THE EMBODIMENT

The embodiment is a frameset made of aluminum alloy (e.g., 6061-T6) in which the tubes are TIG welded directly to each other and the welded assembly is fully heat-treated to restore the strength lost during welding. The tubes of the frameset other than the head tube and bottom bracket tube are of significantly larger diameters than those of steel frames. Apart from the improvement disclosed in this specification, the frameset is known in the art, though it has only fairly recently been perfected and mass produced and become popular.

The frameset comprises a front triangle consisting of a seat tube 10, down tube 12, bottom bracket tube 14, head tube (not shown) and top tube (also not shown) and a rear triangle consisting of a pair of seat stays (not shown), a pair of chainstays 15, and rear wheel dropouts (not shown). All of the tubes are straight and of uniform cross section along their lengths, and all of them are round and of uniform wall thickness, except the seat stays are, preferably, of elliptical cross section, as described in U.S. patent application Ser. No. 456,302, filed Jan. 6, 1983, of the present inventor.

The down tube 12 has a larger diameter than either the seat tube 10 or the bottom bracket tube 14 and is joined to the bottom bracket tube along a fish-mouth mitre 16 centered on and aligned with the centerine A of the bottom bracket and of a diameter equal to the outside diameter of the bottom bracket. Another circular cylindrical mitre 18 is formed in the down tube 12 centered on and aligned with the centerline B of the seat tube 10 and of a diameter equal to the O.D. of the seat tube. The seat tube 10 has a circular cylindrincal mitre 20 centered on and aligned with the centerline A of the bottom bracket tube 14 and of a diameter equal to the bottom bracket O.D. As the dashed lines indicate, the bottom end 22 of the seat tube 10 is cut off perpendicular to its centerline along a plane that includes the centerline A of the bottom bracket tube 14, so most of the mitre 20 bears directly on the bottom bracket tube 14. Because the O.D. of the seat tube 10 is less than the I.D. of the down tube 12, the bottom end of the seat tube extends down into the down tube (see the dashed lines). The chainstays 15 are mitred to fit to the bottom bracket tube 14.

The seat tube 10 is fitted to the bottom bracket 14 and is welded over a small distance along the edge 22. The down tube 12 is fitted to the bottom bracket 14 and seat tube 10, and welds are made at all exposed junctures between them. The chainstays are welded around their entire circumferences to the bottom bracket. Except for the weld at the edge 22, all welding is, of course, done with all components of the frameset fitted together and held in a fixture. After all welds are completed, the frameset is fully heat-treated.

The length of the chainstays is reduced by moving the seat tube forward, relative to the bottom bracket. For any size bicycle, there are several relationships that are dictated by the size of the rider, among them being the position of the seat relative to the bottom bracket and to the handlebars. Within limits, the height and lengthwise position of the seat can be adjusted, which means that the position of the upper end of the seat tube can be changed, albeit within a range of not more than about one inch. Assuming that a known geometry is optimized as far as the location of the upper end of the seat tube is concerned, that design can be enhanced, with respect to chain stay length, by either translating the seat tube forward to locate the new centerline parallel to but forward of the original centerine or by changing the angle or rake more forwardly, i.e., leaving the upper end where it is and moving the bottom end forward. Of course, a smaller shift forward at the top and a greater shift forward at the bottom is entirely suitable.

With the aluminum frame shown in the drawing, it is desirable that most of the bottom edge of the seat tube bear against the bottom bracket, so that the load is transferred primarily to the bottom bracket rather than the down tube and so that good mitre fits can be made between all components of the down tube juncture. This is also desirable from the point of view of providing a good weld at the edge 22—a more forward position of the lower end of the down tube than the one shown in the drawing will leave a large space between the edge 22 and the front of the bottom bracket, which is less desirable for welding, as well as being inferior structurally.

The phantom line H—H in the drawing represents a horizontal plane of the frameset (the horizontal is with reference to a plane defined by the wheel axles) that includes the centerline of the bottom bracket tube 14. The centerline B of the seat tube 10 intersects the plane H—H at a point P that lies forward of the centerline A of the bottom bracket tube by a distance D. Preferably, the distance D is less than the outside radius (half the O.D.) of the seat tube, so that somewhat more than half of the end of the seat tube rests on the bottom bracket.

A specific example of the embodiment shown in the drawings has the following dimensions:
Seat tube: 1.250" O.D., 1.070" I.D.
Down tube: 1.750" O.D., 0.058" W.T.
Bottom bracket: 1.625" O.D., 1.315 I.D.
Dimension D: 0.375"
Chainstay length (from centerline of bottom bracket tube to centerline of rear axle): 15.750"

The lengths of the various members of a bicycle frameset are taken between the centerlines of the members they intersect. Moving the seat tube forward while keeping it at the same rake reduces the lengths of the top tube and the down tube, thereby stiffening the main triangle. The wheelbase is also reduced by the reduction of chainstay length afforded by the present invention (assuming that the distance between the front axle and the centerline of the bottom bracket is not changed). Thus, the invention provides advantages in addition to the main advantage of increased stiffness of the rear triangle.

Approximately one-half of the circumference of the seat tube is welded to the bottom bracket, and the remaining one-half is welded to the down tube. Well over half the circumference of the down tube is welded to the bottom bracket. From a structural point of view, the effective lengths of both the seat tube and down tube are less than they are with prior designs, all other things being equal, because they strengthen each other in bending and torsion at the juncture.

The present invention can be used with steel tube framesets and with other assembly and joinder systems.

I claim:

1. In a racing bicycle frameset in which a single straight seat tube is joined to a bottom bracket, the improvement wherein the centerline of the seat tube intersects the horizontal plane of the frameset that includes the centerline of the bottom bracket tube a substantial distance forwardly of the bottom bracket tube centerline, said distance being less than the outside radius of the seat tube.

2. In a racing bicycle frameset that includes a single straight seat tube, a down tube and a tubular bottom bracket, all of aluminum alloy joined directly to each other by weldments at junctures with each other, the down tube having an outside diameter substantially greater than the outside diameter of the seat tube, the improvement wherein the centerline of the seat tube intersects the horizontal plane of the frameset that includes the centerline of the bottom bracket tube a substantial distance forwardly of the bottom bracket tube centerline.

3. The improvement according to claim 2 wherein said distance is less than the outside radius of the seat tube.

* * * * *